United States Patent
Grant et al.

(10) Patent No.: US 9,684,963 B2
(45) Date of Patent: Jun. 20, 2017

(54) SYSTEMS AND METHODS FOR DYNAMIC REGISTRATION OF MULTIMODAL IMAGES

(71) Applicant: FLIR Systems, Inc., Wilsonville, OR (US)

(72) Inventors: Gregory Grant, Goleta, CA (US); Nicholas Högasten, Santa Barbara, CA (US); Scott McNally, Goleta, CA (US); Richard Cagley, Goleta, CA (US)

(73) Assignee: FLIR Systems, Inc., Wilsonville, OR (US)

(*) Notice: Subject to any disclaimer, the term of this patent is extended or adjusted under 35 U.S.C. 154(b) by 0 days.

(21) Appl. No.: 14/986,571

(22) Filed: Dec. 31, 2015

(65) Prior Publication Data

US 2016/0196653 A1    Jul. 7, 2016

Related U.S. Application Data

(60) Provisional application No. 62/099,121, filed on Dec. 31, 2014.

(51) Int. Cl.
*G06T 7/00* (2017.01)
*H04N 5/33* (2006.01)
*H04N 5/225* (2006.01)
*G06T 7/33* (2017.01)

(52) U.S. Cl.
CPC .............. *G06T 7/0028* (2013.01); *G06T 7/33* (2017.01); *H04N 5/2258* (2013.01); *H04N 5/33* (2013.01); *H04N 5/332* (2013.01); *G06T 2207/10004* (2013.01); *G06T 2207/10048* (2013.01); *G06T 2207/20221* (2013.01)

(58) Field of Classification Search
CPC ......... G06T 7/0028; G06T 2207/20221; G06T 2207/10004; G06T 2207/10048; G06T 7/33; H04N 5/2256; H04N 5/33; H04N 5/332; H04N 5/2258
USPC ........................................................ 382/294
See application file for complete search history.

(56) References Cited

U.S. PATENT DOCUMENTS

| | | | | |
|---|---|---|---|---|
| 7,652,251 B1 * | 1/2010 | King | ...................... | G02B 23/12 250/332 |
| 7,924,312 B2 * | 4/2011 | Packard | ................ | G06T 7/0028 348/164 |
| 9,204,062 B2 * | 12/2015 | Bergstrom | ........... | H04N 5/2258 |

(Continued)

*Primary Examiner* — Yon Couso
(74) *Attorney, Agent, or Firm* — Haynes and Boone, LLP

(57) ABSTRACT

Various techniques are disclosed for a system and method to dynamically co-register images captured by two or more separate imaging modules. For example, in one embodiment, a method includes: capturing a thermal image of an object; capturing a visible light (VL) image of the object; determining a plurality of thermal image reference points from the thermal image; determining a plurality of VL image reference points from the VL image; determining a geometric transform based on the plurality of thermal image reference points and the plurality of VL image reference points; and applying the geometric transform to the thermal image or the VL image to align the thermal image and the VL image. In another embodiment, an imaging system comprises two or more separate imaging modules and one or more processors configured to perform the method above to dynamically co-register images.

20 Claims, 9 Drawing Sheets

(56) References Cited

U.S. PATENT DOCUMENTS

2011/0122251 A1* 5/2011 Schmidt ............... G06K 9/2018
                                                    348/164
2015/0154470 A1* 6/2015 Oh ........................ G06K 9/629
                                                    382/209

* cited by examiner

SYSTEMS AND METHODS FOR DYNAMIC REGISTRATION OF MULTIMODAL IMAGES

CROSS-REFERENCE TO RELATED APPLICATIONS

This patent application claims the benefit of and priority to U.S. Provisional Patent Application No. 62/099,121 filed Dec. 31, 2014 and entitled "SYSTEMS AND METHODS FOR DYNAMIC REGISTRATION OF MULTIMODAL IMAGES" which is hereby incorporated by reference in its entirety.

TECHNICAL FIELD

One or more embodiments of the disclosure relate generally to multi-sensor imaging systems and methods, and more particularly, for example, to techniques to register images captured by imaging sensors operating in different modalities.

BACKGROUND

Imaging systems exist that use two or more separate imagers to capture two or more separate images or video streams of a target object or scene. For example, a multimodal imaging system (also referred to as a multispectral imaging system) that comprises at least two imaging modules configured to capture images in different spectra (e.g., different wavebands) is useful for analysis, inspection, or monitoring purposes, since a same object or scene can be captured in images of different spectra that can compared, combined, or otherwise processed for a better understanding of the target object or scene.

However, due to different field-of-views (FOVs), different orientations, and/or the relative physical displacements between the two or more separate imagers in such systems, images captured by one imaging module may show different portions of a target object or scene and/or show the target object or scene in different positions and sizes than images captured by other imaging modules of the imaging system. In other words, the two or more separate image or video streams captured by such systems are misaligned, which makes it difficult to combine, compare, or otherwise process or analyze the separately captured image or video streams.

Conventionally, registration (e.g., alignment) of such separately captured image or video streams is achieved by mechanically aligning (e.g., fixing the physical displacement and positions of) the two or more imagers under a very tight tolerance, manufacturing optical elements and imaging sensors under a very tight tolerance, and by calibrating the imaging modules/devices that are manufactured and aligned under the tight tolerance such that one or more of the separately captured image or video streams can be image-processed according to the calibration to obtain registered images.

However, such tightly controlled mechanical alignment, manufacturing, and calibration are costly, not always available, not stable, or otherwise impractical. Obtaining or maintaining registration calibration is problematic for multimodal imaging systems because the separately captured images are of different modality, and especially problematic for imaging systems in which a user is given the freedom and flexibility to add or replace imagers, such as for example by attaching a device attachment having a specialty imager to a mobile device equipped a digital camera, because the mechanical alignment of the different imagers is not known, not stable, and/or not controlled at the time of the production.

Accordingly, there is a need for an imaging system that can dynamically co-register two or more image/video streams, captured by separate imagers, including imagers of different modality, even when the mechanical alignment of the different imagers is not known, not stable, and/or not controlled at the time of the production.

SUMMARY

Various techniques are disclosed, in accordance with one or more embodiments, for a system and a method to dynamically co-register images captured by two or more separate imaging modules. For example, in one embodiment, an imaging system includes: a thermal imaging device comprising a thermal imaging module configured to capture a thermal image of an object; a visible light (VL) imaging device comprising a VL imaging module configured to capture a VL image of the object; and one or more processors communicatively coupled to the thermal imaging module and the VL imaging module, the one or more processors configured to: determine a plurality of thermal image reference points from the thermal image, determine a plurality of VL image reference points from the VL image, determine a geometric transform based on the plurality of thermal image reference points and the plurality of VL image reference points, such that the geometric transform at least approximately maps the plurality of thermal image reference points to the plurality of VL image reference points or at least approximately maps the plurality of VL image reference points to the plurality of thermal image reference points, and apply the geometric transform to the thermal image or the VL image to align the thermal image and the VL image.

In another embodiment, a method includes: capturing a thermal image of an object; capturing a VL image of the object; determining a plurality of thermal image reference points from the thermal image; determining a plurality of VL image reference points from the VL image; determining a geometric transform based on the plurality of thermal image reference points and the plurality of VL image reference points, such that the geometric transform at least approximately maps the plurality of thermal image reference points to the plurality of VL image reference points or at least approximately maps the plurality of VL image reference points to the plurality of thermal image reference points; and applying the geometric transform to the thermal image or the VL image to align the thermal image and the VL image.

In some embodiments, the imaging system and the method may perform or include operations to correct parallax errors between the captured or the aligned thermal images and the corresponding captured or aligned VL images. For example, in one embodiment, the one or more processors of the imaging system are configured to: receive a thermal image (e.g., the aligned thermal image or the captured thermal image) and a VL image (e.g., the aligned VL image or the captured VL image); determine a thermal edge image based on the thermal image, the thermal edge image representing edges and/or contours captured in the thermal image; determine a VL edge image based on the VL image, the VL edge image representing edges and/or contours captured in the VL image; determine, based on the VL edge image and the thermal edge image, a horizontal translation (e.g., an X-translation, a translation in the X-axis or column direction) and a vertical translation (e.g., a Y-translation, a translation in the Y-axis or row direction) from a range of horizontal and vertical translations, such that a correlation between the VL edge image and the thermal edge image is highest when the VL edge image or the thermal edge is translated according to the horizontal translation and the vertical translation; and apply the horizontal translation and the vertical translation to the thermal image or the VL image to correct a parallax error between the thermal image and the VL image.

In another embodiment, the method includes: receiving a thermal image (e.g., the aligned thermal image or the captured thermal image) and a VL image (e.g., the aligned VL image or the captured VL image); determining a thermal edge image based on the thermal image, the thermal edge image representing edges and/or contours captured in the thermal image; determining a VL edge image based on the VL image, the VL edge image representing edges and/or contours captured in the VL image; determining, based on the VL edge image and the thermal edge image, a horizontal translation (e.g., an X-translation, a translation in the X-axis or column direction) and a vertical translation (e.g., a Y-translation, a translation in the Y-axis or row direction) from a range of horizontal and vertical translations, such that a correlation between the VL edge image and the thermal edge image is highest when the VL edge image or the thermal edge is translated according to the horizontal translation and the vertical translation; and applying the horizontal translation and the vertical translation to the thermal image or the VL image to correct a parallax error between the thermal image and the VL image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
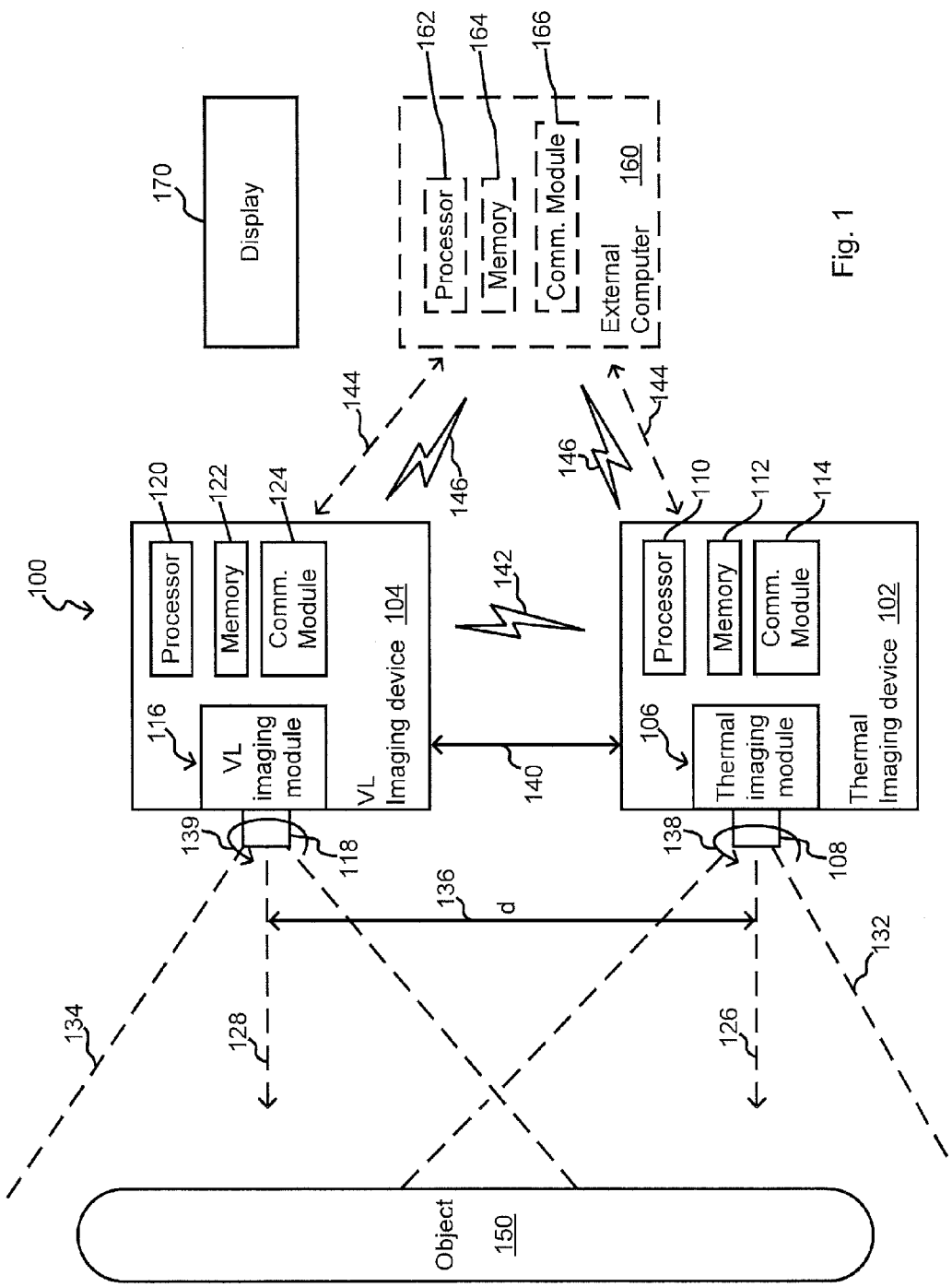
FIG. 1 illustrates a multimodal imaging system including a thermal imaging device and a visible light (VL) imaging device, in accordance with an embodiment of the disclosure.

FIG. 1 is a block diagram illustrating a multimodal imaging system 100, in accordance with an embodiment of the disclosure. Multimodal imaging system 100, also referred to as multispectral imaging system, 1 includes a thermal imaging device 102 (e.g., a thermal camera) and a visible light (VL) imaging device 104 (e.g., a digital camera). Thermal imaging device 102 may include a thermal imaging module 106 configured to capture an image (e.g., a still image and/or a video frame to produce a video stream) in a thermal spectrum (also referred to as a thermal waveband), for example a thermal image of an object 150. In this regard, thermal imaging module 106 may include a thermal imaging sensor implemented, for example, as microbolometers, thermopiles, or other types of thermal imaging infrared sensors arranged as a focal plane array (FPA) in any desired array pattern and configured to detect infrared radiation (e.g., infrared energy) in mid wave infrared (MWIR) spectrum/waveband, long wave infrared (LWIR) spectrum/wavebands, and/or other thermal imaging bands as may be desired in particular implementations.

Thermal imaging module 106 may also include one or more optical elements 108, such as infrared-transmissive lenses, prisms, infrared reflectors, and/or other infrared optical elements, configured to transmit, direct, and/or focus the infrared radiation from a target object (e.g., object 150) onto the thermal imaging sensor. In some embodiments, thermal imaging module 106 may be implemented with a small form factor and in accordance with wafer-level packaging techniques or other packaging techniques to include a housing, the thermal imaging sensor, one or more optical elements 108, a circuit board, and/or other logic devices in a small package. In one example, thermal imaging module 106 may be implemented in accordance with any of the various techniques disclosed in U.S. patent application Ser. No. 14/101,258 filed Dec. 9, 2013 and entitled "Infrared Camera System Architectures," which is hereby incorporated by reference in its entirety.

Thermal imaging device 102 may also include a processor 110, a memory 112, and/or a communication module 114, in accordance with various embodiments of the disclosure. Processor 110 may be implemented as any appropriate device (e.g., programmable logic device, microcontroller, processor, application specific integrated circuit (ASIC), or other device) that may be used by thermal imaging device 102 to execute appropriate instructions, such as software instructions provided in memory 112. Memory 112 may include one or more memory devices or electro-mechanical storage devices and associated logic (e.g., implemented in hardware, software, or a combination of both) for storing and accessing data and information in the one or more memory or electro-mechanical storage devices. The one or more memory or electro-mechanical storage devices may include various types of volatile and non-volatile memories and storages, such as a hard disk drive, a flash memory, a RAM (Random Access Memory), an EEPROM (Electrically-Erasable Read-Only Memory), and other devices for storing digital information such as software instructions configured to cause processor 110 to perform all or part of the various methods described herein and data/parameters to be used or generated in the various methods described herein.

Communication module 114 may be configured to facilitate wired and/or wireless communication between thermal imaging device 102 and other components of multimodal imaging system 200. In various embodiments, communication module 114 may support the IEEE 802.3 Ethernet standards, the IEEE 802.11 WiFi standards, the Bluetooth™ standard, the ZigBee™ standard, near field communication (NFC) standards, or other appropriate wired and wireless communication standards.

VL imaging device 104 includes a VL imaging module 116 configured to capture a VL image (e.g., a still image and/or a video frame to produce a video stream) of an object (e.g., object 150). In this regard, VL imaging module 116 may include a VL imaging sensor implemented with a charge-coupled device (CCD) sensor, a complementary metal-oxide semiconductor (CMOS) sensor, an electron multiplying CCD (EMCCD), a scientific CMOS (sCMOS) sensor and/or other appropriate image sensor to capture visible light images of the scene. Depending on the sensor type, VL imaging module 116 may be adapted to capture electromagnetic radiation in other wavelengths in addition to or instead of visible light. For example, in some embodiments, VL imaging module 116 may be adapted to capture images of near infrared (NIR) and/or short-wave infrared (SWIR) radiation from a target object (e.g., object 150). NIR and SWIR are generally referred to as non-thermal infrared. VL imaging module 116 may also include one or more optical elements 118, such as lenses, prisms, mirrors, and/or other optical elements, configured to transmit, direct, and/or focus the VL emitted or reflected from a target object (e.g., object 150) onto the VL imaging sensor. VL imaging device 104 may also include a processor 120, a memory 122, and/or a communication module 124 each implemented in a similar manner as the corresponding components of thermal imaging device 102 but appropriately modified for operations of VL imaging device 104.

Thus, multimodal imaging system 100 comprises at least two imaging modules 106 and 116 that are configured to capture images in different spectra (e.g., different wavebands), in other words, operate in different modalities. Such multimodal imaging system may be useful for analysis, inspection, or monitoring purposes, for example, since a same object or scene can be captured in images of different modality that can compared, combined, or otherwise processed for a better understanding of the object or scene.

However, due to the relative physical displacement between the two imaging modules 106 and 116 and different field-of-views (FOVs) 132 and 134 of the two imaging modules 106 and 116, for example, images captured by one imaging module may show different portions of a target object or scene, or show the target object or scene in different positions (e.g., different angular and spatial positions) and different sizes than images captured by the other imaging module. In other words, it may be understood that each imaging module images an object or scene in its own local coordinate system.

For example, the pointing direction 126, the properties of optical elements 108, and the size and position of the thermal imaging sensor may determine FOV 132 of thermal imaging module 106, which may be different from FOV 134 of VL imaging module 116 dependent on the pointing direction 128, the properties of optical elements 118, and the size and position of the VL imaging sensor. Furthermore, due to a physical displacement 136 (only a two-dimensional displacement is indicated in FIG. 1 for clarity) between the two imaging modules 106 and 116, a parallax effect may be exhibited. In addition, the angular orientations 138 and 139 of the two imaging modules 106 and 116 may be different, which would cause the target object or scene to appear in different angular positions in images captured by the two imaging modules 106 and 116. These and other factors may produce a thermal image and VL image that are not co-registered with one another.

While registration (e.g., alignment) of the thermal image and the VL image may be achieved by mechanically aligning (e.g., fixing the physical displacement and positions of) the imaging modules and manufacturing optical elements and imaging sensors under a very tight tolerance, and by calibrating the imaging modules/devices that are manufactured and aligned under the tight tolerance such that one or both of the images can be image-processed according to the calibration to register the images, such tightly controlled mechanical alignment, manufacturing, and calibration are costly, not always available, not stable, or otherwise impractical. For example, multimodal imaging system 100 may represent a system having separate thermal imaging device 102 and VL imaging device 104, which may be manufactured separately (e.g., by different manufacturers) and installed by a user using the separately obtained devices 102 and 104. Such an example of multimodal imaging system 100 may be desirable in that it affords a user the freedom and flexibility to expand an existing imaging device by adding an additional imaging device of the user's own choosing, but the physical displacement and positions of the imaging modules are not known and/or not controlled at the time of production.

Thus, instead of requiring or relying on a mechanical alignment and calibration during production, various embodiments of the disclosure may advantageously perform dynamic co-registration (e.g., alignment) of images captured by two or more imaging modules, even when the mechanical alignment of the two or more imaging modules is not known, not stable, and/or not controlled at the time of production. In this regard, according to various embodiments, processor 110 and/or processor 120 may be configured (e.g., by hardwired logic, by configuring programmable logic, by executing software instructions stored in memory 122 and 124, or any combination thereof) to perform any of the various embodiments of the method discussed herein with reference to FIGS. 3-10 to dynamically co-register images. In various embodiments, processors 110 and 120 may be configured communicate with one another over a wired connection 140 and/or wireless connection 142 via communication modules 114 and 124 when needed to perform various operations of the methods discussed herein.

In some embodiments, multimodal imaging system 100 may also include an external computer 160 which may be configured to communicate with thermal imaging device 102, VL imaging device 104, or both via wired connections 144 and/or wireless connections 146. In this regard, external computer 160 may include a processor 162, a memory 164, and/or a communication module 166 each implemented in a similar manner as the corresponding components of thermal imaging device 102 or VL imaging device 14, but appropriately modified for operations of external computer 160. In one embodiment, processor 162 may additionally or alternatively be configured to perform all or part of the various embodiments of the method discussed herein with reference to FIGS. 3-10 to dynamically co-register images.

In some embodiments, multimodal imaging system 100 may also include a display 170 implemented with an electronic display screen, such as a LCD, a LED, an OLED, a cathode ray tube (CRT), or other types of generally known electronic displays suitable for showing images and/or videos. In such embodiments, processors 110, 120, and/or 162 may be configured to control display 170 to display captured thermal images (e.g., still images or video), captured VL images (e.g., still images or video), co-registered and combined thermal and VL images (e.g., still images or video), and/or otherwise processed thermal and VL images. Depending on embodiments, display 170 may be implemented as part of thermal imaging device 102, VL imaging device 104, and/or external computer 160, or implemented separately from those components of multimodal imaging system 100. In some embodiments, display 170 may comprise a touch-sensitive panel configured to provide touch screen capabilities to receive user input.

Figure 2:
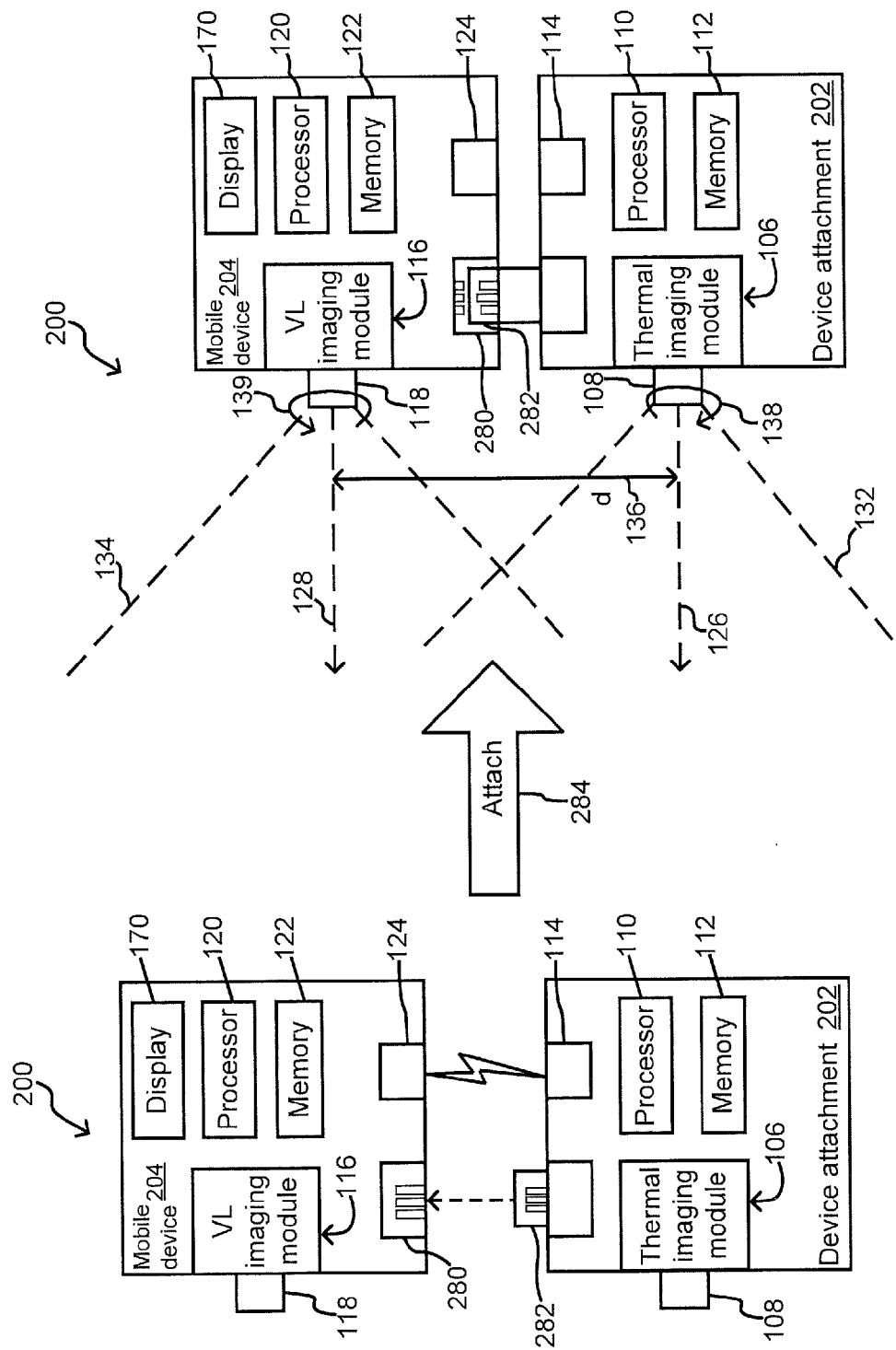
FIG. 2 illustrates a multimodal imaging system including a mobile device and a device attachment in accordance with another embodiment of the disclosure.

FIG. 2 shows a block diagram of a multimodal imaging system 200 according to another embodiment of the disclosure. In multimodal imaging system 200, VL imaging device 104 of multimodal imaging system 100 is implemented as a mobile device 204, and thermal imaging device 102 of multimodal imaging system 100 is implemented as a device attachment 202 that is configured to be releasably attached to mobile device 204 to provide multimodal imaging, but otherwise comprise similar components as corresponding VL and thermal imaging device 102 and 104 appropriately modified for a mobile application. For example, mobile device 204 may be a smart phone, a digital camera, a media player device, a tablet computer, such as iPhone™ devices, iPad™ devices, or iPod Touch™ devices from Apple, Inc.®, and Android™ smart phones and tablets from Samsung Electronics, Co., Ltd.® and other manufacturers.

In this regard, mobile device 204 may include a device connector receptacle 280 (e.g., a connector socket) implemented according to the connector specification associated with the type of mobile device 204, and device attachment 202 may include a complementary device connector 282. For example, device connector receptacle 280 and device connector 282 may implement a proprietary connector receptacle/plug pair (e.g., an Apple® dock connector for iPod™ and iPhone™ such as a "Lightning" connector, a 30-pin connector, or others) or a standardized connector receptacle/plug pair (e.g., various versions of Universal Serial Bus (USE) connectors, Portable Digital Media Interface (PDMI), or other standard connectors as provided in user devices). As may be understood, device connector receptacle 280 may include a mechanical fixture (e.g., locks, latches, and other fixtures) to releasably receive and retain corresponding device connector 282 of device attachment 202 by friction or other mechanisms. When engaged, device connector receptacle 280 and device connector 282 may provide wired connections between device attachment 202 and mobile device 204 for communications (e.g., similar to wired connection 140) and optionally for power supply.

In one embodiment, device attachment 202 may be configured to releasably attach to mobile device 204 via device connector 282 engaging the complementary device connector receptacle 280 of mobile device without relying on an additional device attachment mechanism such as a clamp or a device cover, in a similar manner as one embodiment disclosed in International Patent Application No. PCT/US2013/062433, filed Sep. 27, 2013 and entitled "DEVICE ATTACHMENT WITH INFRARED IMAGING SENSOR," which is incorporated herein by reference in its entirety. In other embodiments, device attachment 202 may comprise a latch or a device cover configured to releasably attach to and/or retain mobile device 204. In other aspects, device attachment 202 may be implemented according to various techniques disclosed in International Patent Application No. PCT/US2013/062433 referenced above.

In the example of FIG. 2, multimodal imaging system 200 is shown both prior to attaching 284 and after attaching 284 device attachment 202 to mobile device 204 via device connector receptacle 280 and device connector 282. As may be appreciated, because different implementations of mobile device 204 (e.g., different models of smart phones or smart phones from different manufacturers) typically provide different relative displacement between thermal imaging module 106 and VL imaging module 108 and have different FOVs for VL imaging module 108, and/or because the mechanical alignment of mobile device 204 and device attachment 202 are unstable and/or not tightly controlled when releasably attached via device connector receptacle 280 and device connector 282, it would be insufficient or impracticable to provide registration calibration during the production of mobile device 204 and/or device attachment 202. Thus, as discussed above with reference to FIG. 1, in various embodiments of multimodal imaging system 200, processors 110 and/or 120 may be configured to perform any of the various embodiments of the method discussed herein with reference to FIGS. 3-10 to dynamically co-register images.

Note that although embodiments illustrated with FIGS. 1 and 2 include a thermal imaging module and a VL imaging module to provide multimodal imaging, in other embodiments a multimodal imaging system may additionally or alternatively include any other suitable imaging modules for capturing images in other spectra. For example, a multimodal imaging system may additionally or alternatively include one or more imaging modules configured to capture ultraviolet (UV), X-ray, near IR (NIR), or millimeter wave images, or images in other desired spectrum. Note also that different spectra captured by the two or more imaging modules of a multimodal imaging system need not be mutually exclusive, but may overlap. It is also contemplated that in other embodiments, a multi-imager system having at least two imaging modules capturing images in similar or substantially same spectra/wavebands may be provided and configured to perform dynamic co-registration of images.

Figure 3:
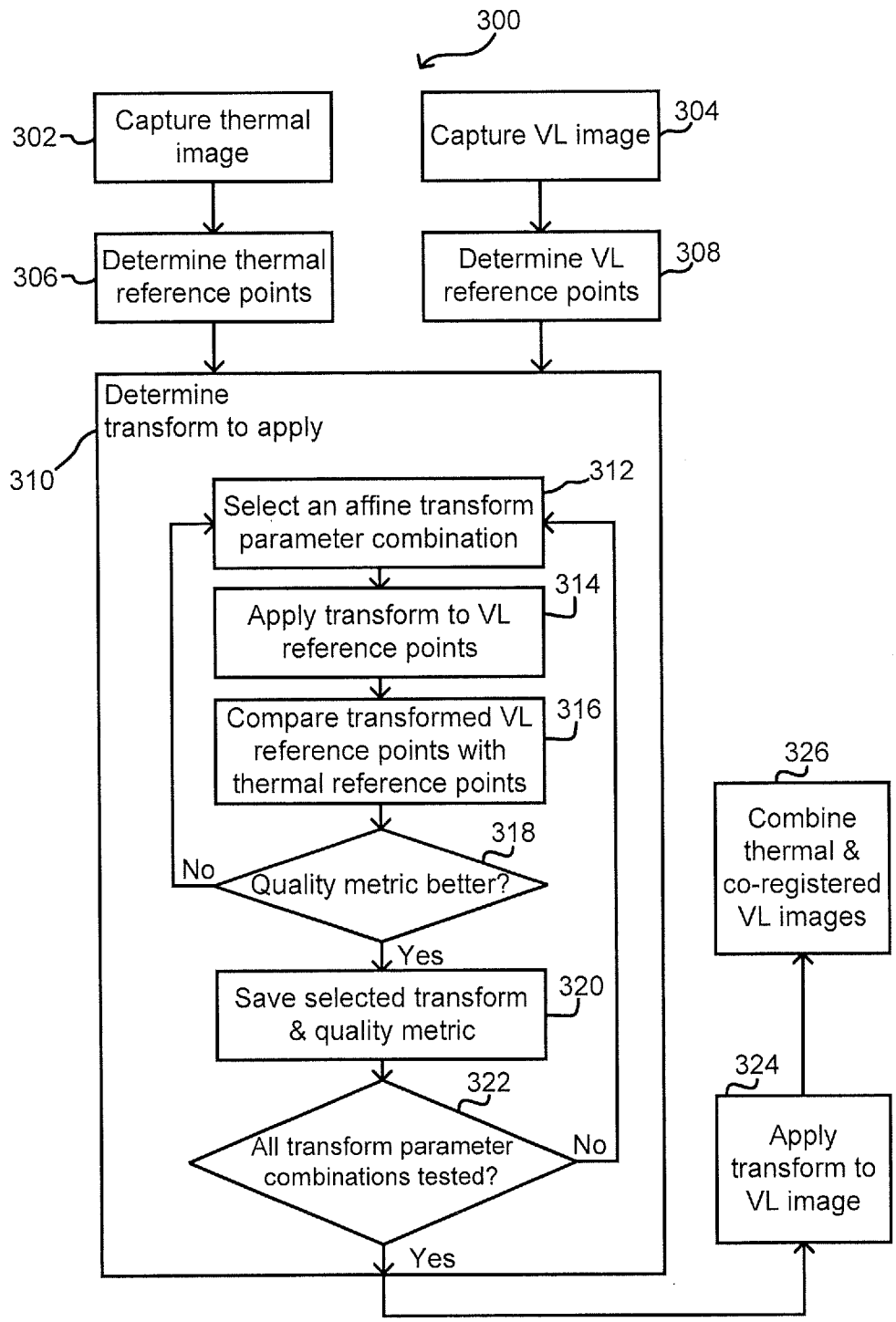
FIG. 3 illustrates a flowchart of a method to dynamically co-register images captured by different imaging modules in accordance with an embodiment of the disclosure.

Turning now to FIG. 3, a flowchart of a method 300 to dynamically co-register images captured by different imaging modules is illustrated in accordance with an embodiment of the disclosure. For example, method 300 may be performed by or for multimodal imaging system 100 or 200 to provided dynamically co-register images.

At blocks 302 and 304, a thermal image and a visible image of an object are captured, respectively. For example, a thermal image and a visible light image of object 150 may respectively be captured using thermal imaging module 106 and VL imaging module 108 each mapping object 150 to a respective coordinate system due to different FOVs, different pointing directions, and/or a parallax. For embodiments in which the thermal image and the VL image are captured from a non-stationary platform such as a mobile device 204 with device attachment 202, the thermal image and the VL image may be captured substantially simultaneously (e.g., accounting for the delay due to electronic processing and/or communication) or otherwise within a tolerable time difference such that the non-stationary platform has remained sufficiently still (e.g., sufficient to carry out operations of method 300) relative to the object.

In various embodiments, the object may be any object that can be imaged (e.g., produce contrast) in both the thermal spectrum and the visible light spectrum. In one example, a hand, face, or other body part of a person (e.g., a user of mobile device 204 having device attachment 202) may be captured in the thermal and visible light images, since body parts typically show sufficient contrast in thermal images due to body temperature and in visible light images under ambient or artificial (e.g., flash light) light.

In experiments carried out in connection with the present disclosure, the inventors have discovered that a human face or hand may effectively be used especially for registration calibration of two or more imagers in the thermal and the visible light spectrum (e.g., when mobile device 204 is powered up with device attachment 202 attached, when device attachment 202 is first attached to mobile device 204, or in other situations when calibration is desired) by various embodiments of method 300, even when the face or hand may be sparsely covered with jewelry or other objects. This is advantageous since a human hand or face is readily available to be imaged when a user wishes to perform registration calibration by embodiments of method 300.

Thus, in some embodiments, the thermal and the VL images captured at blocks 302 and 304 may be of a hand or face of a person. Embodiments that utilize a user's hand is furthermore advantageous since the approximate size of a human hand and/or the approximate distance from the thermal and the VL imagers to the hand (e.g., an arm's length or a reference distance estimated by a tape/string measure provided with device attachment 202) are known and can be used for registration calibration of the imagers to produce co-registered (e.g., aligned) images of objects at desired distances from the imagers as further discussed herein.

In other embodiments, the object may be a reference target that can be imaged (e.g., produce contrast) in both the thermal spectrum and the visible light spectrum. The reference target may, for example, be used for registration calibration such as when mobile device 204 is powered up with device attachment 202 attached, when device attachment 202 is first attached to mobile device 204, or in other situations when calibration is desired. The reference target may be of a specific shape and size and of a material or materials having specific infrared emissivity/reflectance such that the IR radiation intensity may be different from that of the background even when at ambient temperature. For example, the reference target may be implemented using a metal tape or other material with specific infrared emissivity/reflectance laid out in a cross-hair shape or other desired shape affixed to a small card or product packaging, such that it may be provided to a user when device attachment 202 is purchased and/or conveniently carried and utilized by the user to perform registration calibration. In some embodiments, the known size and/or shape of the reference target may be utilized to produce co-registered (e.g., aligned) images of objects at desired distances from the imagers as further discussed herein.

Note that although the embodiments illustrated with reference to FIG. 3 utilize a thermal image and a visible light image, other embodiments of method 300 may utilize any two or more multispectral images (also referred to as multimodal images) of the object captured in different spectra. For example, the images captured at blocks 302 and 304 may alternatively or additionally be a combination of ultraviolet (UV), X-ray, near IR (NIR), or millimeter wave images, or images in other desired spectrum showing the object with sufficient contrast (e.g., sufficient to perform operations of method 300). Thus, in various other embodiments, operations of method 300 may involve such other images instead of or in place of a thermal image and/or a visible light image referenced in the example of FIG. 3.

At blocks 306 and 308, a plurality of reference points are determined from the object captured in the thermal image and the visible light image, respectively. In some embodiments, blocks 306 and/or 308 may include adjusting the resolution of the thermal image and/or the resolution of the visible light image, so that the resolutions approximately match one another (e.g., accounting for a mismatch in aspect ratio or other tolerances) prior to determining the reference points. For example, if thermal imaging module 106 and VL imaging module 108 used to capture the thermal image and the visible light image have different spatial resolutions (e.g., as measured by instantaneous FOV, pixels/mrad, or other metrics), the higher resolution image can be down-sampled, the lower resolution image can be up-sampled, or both images can be adjusted to a third resolution so as to approximately match the resolution. Embodiments including such resolution adjustment may beneficially increase the likelihood of determining similar reference points in the thermal image and the corresponding visible light image.

Figures 4A, 4B:
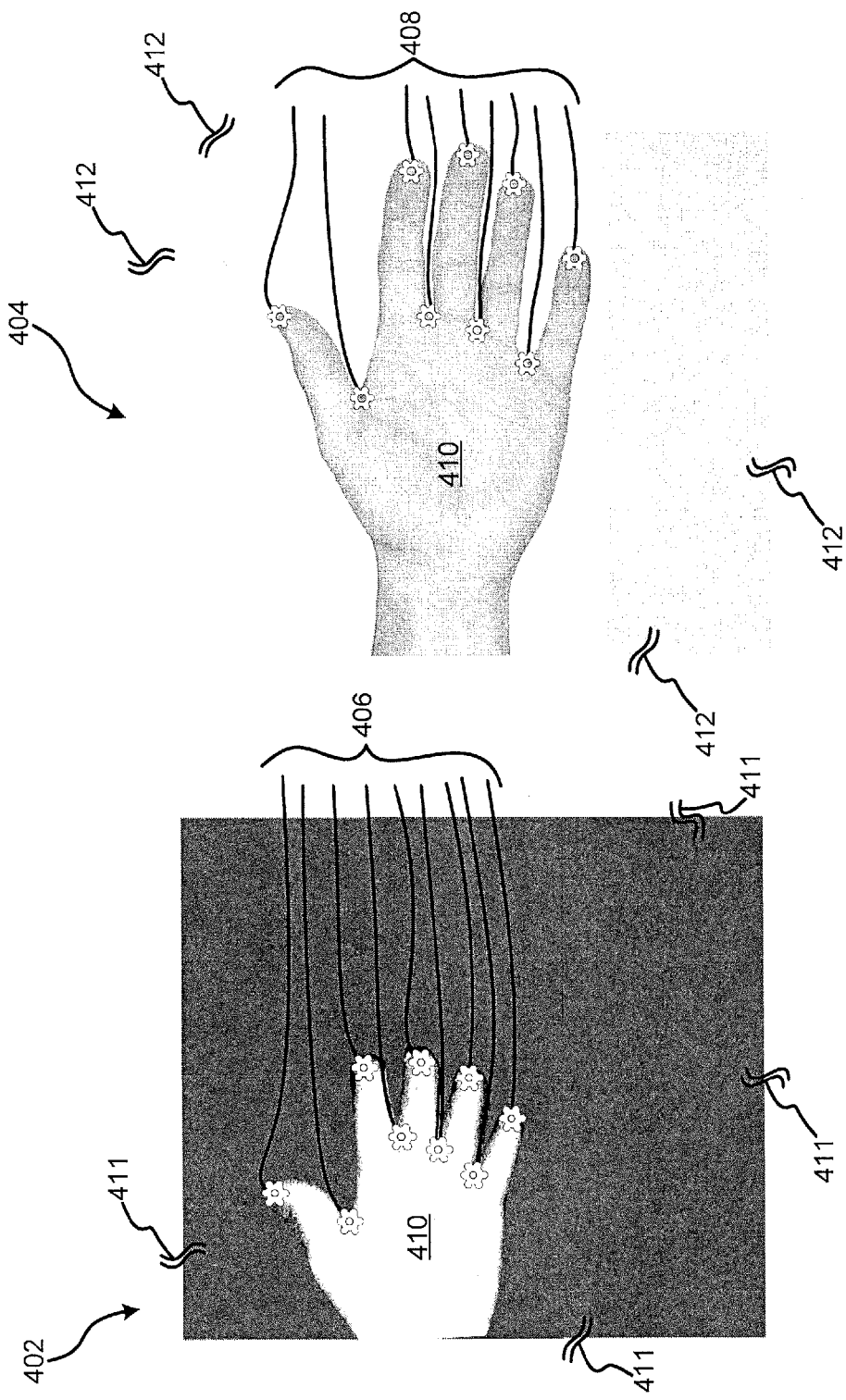
FIG. 4A illustrates an example thermal image with a plurality of thermal image reference points determined in accordance with an embodiment of the disclosure.
FIG. 4B illustrates an example VL image with a plurality of VL image reference points determined in accordance with an embodiment of the disclosure.

Referring also to FIGS. 4A and 4B, an example of a plurality of thermal image reference points 406 determined at block 306 from a thermal image 402 of an object 410 (e.g., a hand) captured at block 302 and an example of a plurality of VL image reference points 408 determined at block 308 from a VL image 404 of object 410 captured at block 304 are indicated (shown in circles for illustration purposes) in accordance with an embodiment of the disclosure.

In the example shown with reference to FIGS. 4A and 4B, peak corner points from object 410 in thermal image 402 may be determined as thermal image reference points 406 using eigenvalues and eigenvectors, and similarly, peak corner points from object 410 in VL image 404 may be determined as VL image reference points 408 using eigenvalues and eigenvectors. Generally for various embodiments, the determination of peak corner points may be performed using various corner detection techniques (e.g., with appropriate modifications if required) such as Harris & Stephens, Plessey, Shi-Tomasi, Wang-Brady, or SUSAN corner detection algorithms, or any other appropriate corner detection algorithms, some of which utilize eigenvectors and/or eigenvalues. Other feature detection techniques such as various line detection, blob detection, or ridge detection algorithms may alternatively or additionally be utilized to detect reference points 406 and 408.

Blocks 306 and/or 308 may also include excluding reference points near image borders 411 and 412, for example within 5 pixels or other predetermined pixels of borders 411 and 412, as desired for particular implementations or applications. Such embodiments may better allow for cases in which some reference points in one type of image (e.g., thermal or VL image) may not have corresponding reference points in the other type of image (e.g., VL image or thermal) due to different FOVs, different pointing directions, parallax, and/or application of transformation further described herein.

At block 310, a geometric transform to apply to the thermal image or the VL image is determined based on the reference points 406 and 408. In various embodiments, the geometric transform is determined such that reference points 406 in the thermal image may each be mapped at least approximately to (e.g., deemed matched according to a predetermined metric, criterion, or error threshold) reference points 408 in the VL image, or vice versa, if the geometric transform is applied to the thermal image or the VL image, depending on embodiments. In the embodiments illustrated with reference to FIG. 3, the determined geometric transform is to be applied to the VL image to at least approximately map reference points 408 to corresponding reference points 406 in the thermal image. However, in other embodiments, a geometric transform may be determined for applying instead to the thermal image, or two geometric transforms may be determined respectively for applying to the thermal image and the VL image. One skilled in the art having possession of the present disclosure would be able to modify the embodiments illustrated with reference to FIG. 3 to determine such alternative geometric transform or transforms.

In this regard, the determined geometric transform may be understood as at least approximately mapping reference points 406 in a coordinate system of the captured thermal image and reference points 408 in a coordinate system of the captured VL image to points in a common coordinate system, where the common coordinate system may be the thermal image coordinate system (e.g., in embodiments illustrated with reference to FIG. 3), the VL image coordinate system (e.g., in embodiments where the geometric transform is to be applied to the thermal image), or a coordinate system different from both the thermal image and the VL image coordinate systems.

In some embodiments, the geometric transform may comprise one or more affine transforms. For example, the one or more affine transforms may comprise translation, scaling, rotation, shear mapping, homogeneous dilation, other affine transforms, or any combination thereof. In one specific example according to an embodiment, the geometric transform may be an affine transform combination that comprises translation in the X axis, translation in the Y axis, scaling, and rotation.

In some embodiments, determining the geometric transform may comprise iteratively finding transform parameters for the geometric transform that at least approximately (e.g., satisfying a predetermined metric, criterion, or error threshold) maps reference points 406 to reference points 408, or vice versa, when the geometric transform having the transform parameters is applied to the thermal image or the VL image. In the embodiments illustrated with reference to FIG. 3, operations at block 310 comprise iteratively sweeping over a predetermined range of affine transform parameters to find the affine transform parameters that at least approximately map reference points 408 to reference points 406 when the affine transform combination having the parameters is applied to the VL image.

In one specific example shown in FIG. 3, block 310 comprises selecting at block 312 a combination of affine transform parameters for an affine transform combination including translation in the X axis, translation in the Y axis, scaling, and rotation. Thus, for example, the selected affine transform parameter combination may comprise a parameter for a translation offset in the X axis, a parameter for a translation offset in the Y axis, a parameter for a scaling factor, and a parameter for a rotation angle, which are selected from a predetermined range of parameters. As discussed above, the affine transform combination may alternatively or additionally include other types of affine transform, and thus the affine transform parameter combination may additionally or alternatively comprise parameters associated with such other types of affine transform.

Block 310 further comprises applying the affine transform combination having the selected parameter combination to the VL image reference points 408 at block 314, and comparing the transformed VL image reference points with thermal image reference points 406 at block 316. In some embodiments, the comparison of the transformed VL image reference points with the thermal image reference points 406 may comprise calculating the distances between the transformed VL image reference points and the corresponding thermal image reference points 406, for example, by finding for each transformed VL image reference points a nearest neighbor from among the thermal image reference points 406 and calculating the distance between each nearest neighbor pair.

The result of the comparison between the transformed VL image reference points 408 and the thermal image reference points 406 may than be used to determine whether the VL image reference points 408 transformed with the selected affine transform parameter combination at least approximately maps to the thermal image reference points 406. For example, in embodiments that include calculating the distances between the nearest neighbor pairs of the transformed VL image reference points and the thermal image reference points 406, a mean squared error (MSE) of the distances between the nearest neighbor pairs may be calculated and used as a quality metric that is to be minimized over the predetermined range of the affine transform parameter combinations. That is, if the MSE of the distances between the nearest neighbor pairs is minimized over the predetermined range of the affine transform parameter combinations, the transformed VL image reference points can be considered to be at least approximately mapped to the thermal image reference points 406.

In this regard, in the example shown in FIG. 3, the MSE of the distances between the nearest neighbor pairs is calculated and compared with the lowest MSE from any previous iteration applying the previously selected affine transform parameters, at block 318. If at block 318 it is determined that the MSE obtained for the current iteration is lower than previously stored minimum MSE, then the current MSE and the affine transform parameter combination currently applied are saved as the lowest MSE and the corresponding affine transform parameter combination that produces the lowest MSE at block 320. If at block 318 it is determined that the current MSE does not further minimize the previously saved MSE, then method 300 flows back to block 312 to repeat blocks 312 through 318 with a newly selected combination of affine transform parameters.

Note that although the MSE is used as the quality metric in the embodiments illustrated with reference to FIG. 3, it is also contemplated that the mean absolute deviation (MAD), statistical metrics based on the variance, statistical metrics based on the median, or other appropriate statistical metrics may be used as the quality metric as desired.

At block 322, after saving the current MSE and affine transform parameter combination as the new lowest MSE and the corresponding affine transform parameter combination, it is determined whether all affine transform parameter combinations over the predetermined range have been tested or not (i.e., whether all iterations have been performed or not). If not, method 300 flows back to block 312 to repeat blocks 312 through 320 with a newly selected combination of affine transform parameters. If all combinations over the predetermined range have been tested, then the iterations of blocks 312 through 322 comprised in block 310 are completed.

Thus, after the iterations of blocks 312 through 322 comprised in block 310 are performed, the affine transform combination, having the affine transform parameter combination that minimizes the MSE of the neighboring reference point pair distances over the predetermined range of affine transform parameters, may be determined as the geometric transform to apply to the VL image.

The predetermined range of affine transform parameters may be chosen, for example, based on the characteristics of the thermal imaging module and the VL imaging module, as well as the expected relative displacement of the thermal imaging module 106 and the VL imaging module 108. That is, for example, the range of translation offsets and scaling factors can be bound by the width and/or the height of the thermal image and/or the VL image, and the range of rotation angles can be bound if the typical relative displacement of the thermal and the VL imaging modules would limit the range of the possible rotational offset (e.g., device attachment 202 attaches to mobile device 204 at only a certain range of angles). It is also contemplated that the predetermined range of one or more affine transform parameters may cover all possible ranges (e.g., the rotation angle ranging from 0 degree to 360 degrees). As may be appreciated, if the predetermined range is bound to a meaningful range based on the characteristics and/or the expected relative displacement of the imaging modules, the affine transform parameter combination to apply may be determined more efficiently without significantly affecting the accuracy.

Further in this regard, some embodiments of method 300 may repeat the iterations of blocks 312 through 322 with an increasing level of granularity to improve efficiency in finding the affine transform parameter combination that produces the lowest MSE. For example, first full iterations of blocks 312 through 322 may be performed with the affine transform parameters that are selected in coarse intervals over a wider range to find a rough estimate of the affine transform parameter combination that produces the lowest MSE, and second full iterations of blocks 312 through 322 may be repeated with the affine transform parameters that are selected in finer intervals in a range near the rough estimate to determine the affine transform parameter combination that produces the lowest MSE. In some embodiments, the transformed VL image reference points may be moved randomly (e.g., by up to 2 pixels) during the finer sweep.

Figure 5:
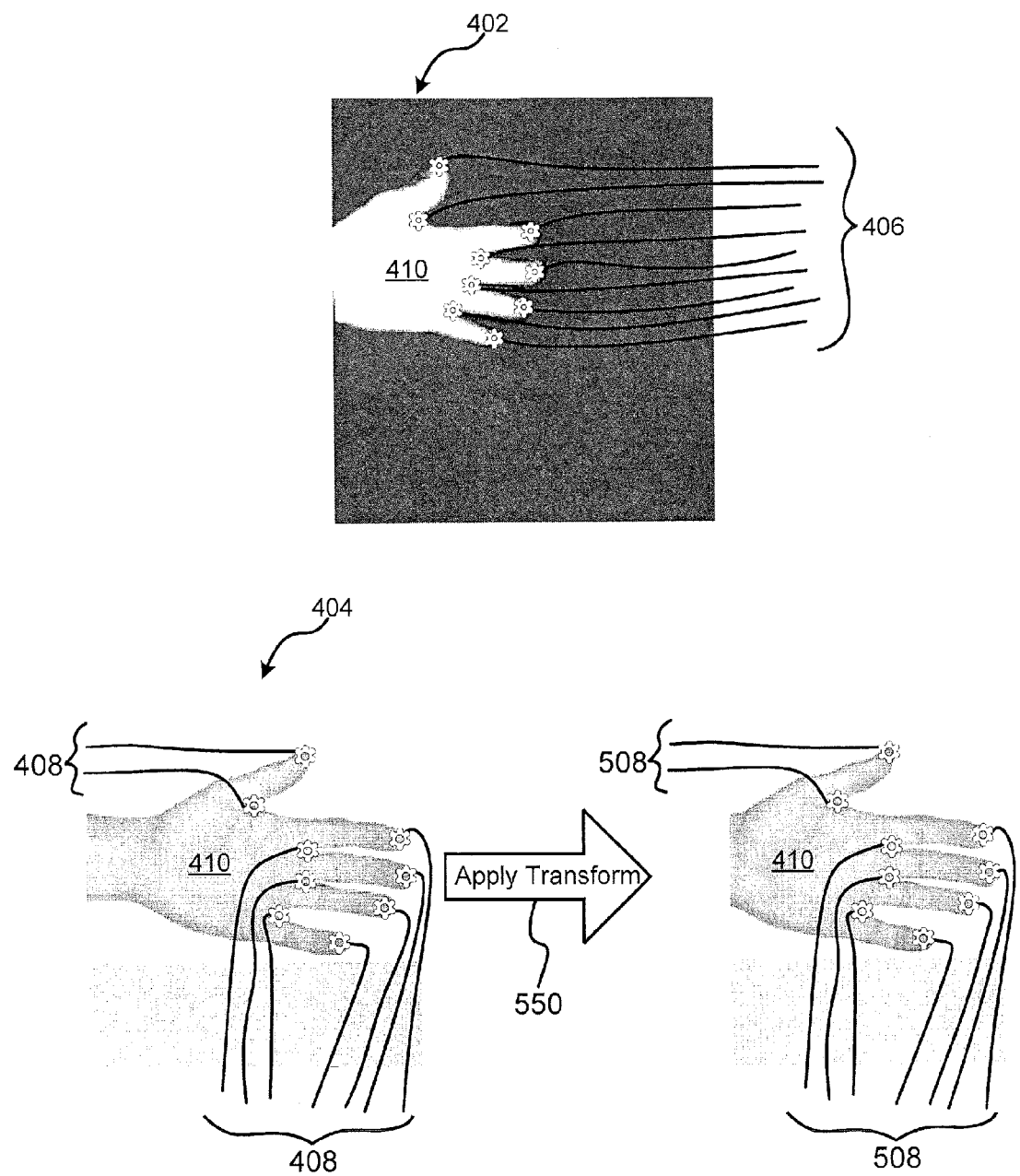
FIG. 5 illustrates example images that show how a plurality of VL image reference points are at least approximately mapped to a plurality of thermal image reference points by a geometric transform in accordance with an embodiment of the disclosure.

Therefore, after block 310, a geometric transform may be determined which at least approximately maps the VL image reference points 408 to the thermal image reference points 406 if applied to the VL image 404, and in some embodiments, such geometric transform may include an affine transform combination with the parameter combination selected to minimize the MSE of the distances of neighboring pairs of the VL image reference points 408 and the thermal image reference points 406. FIG. 5 illustrates an example where such geometric transform, if applied 550, transforms the VL image reference points 408 into transformed VL image reference points 508 which at least approximately map to the corresponding thermal image reference points 406, in accordance with an embodiment of the disclosure.

Figure 6:
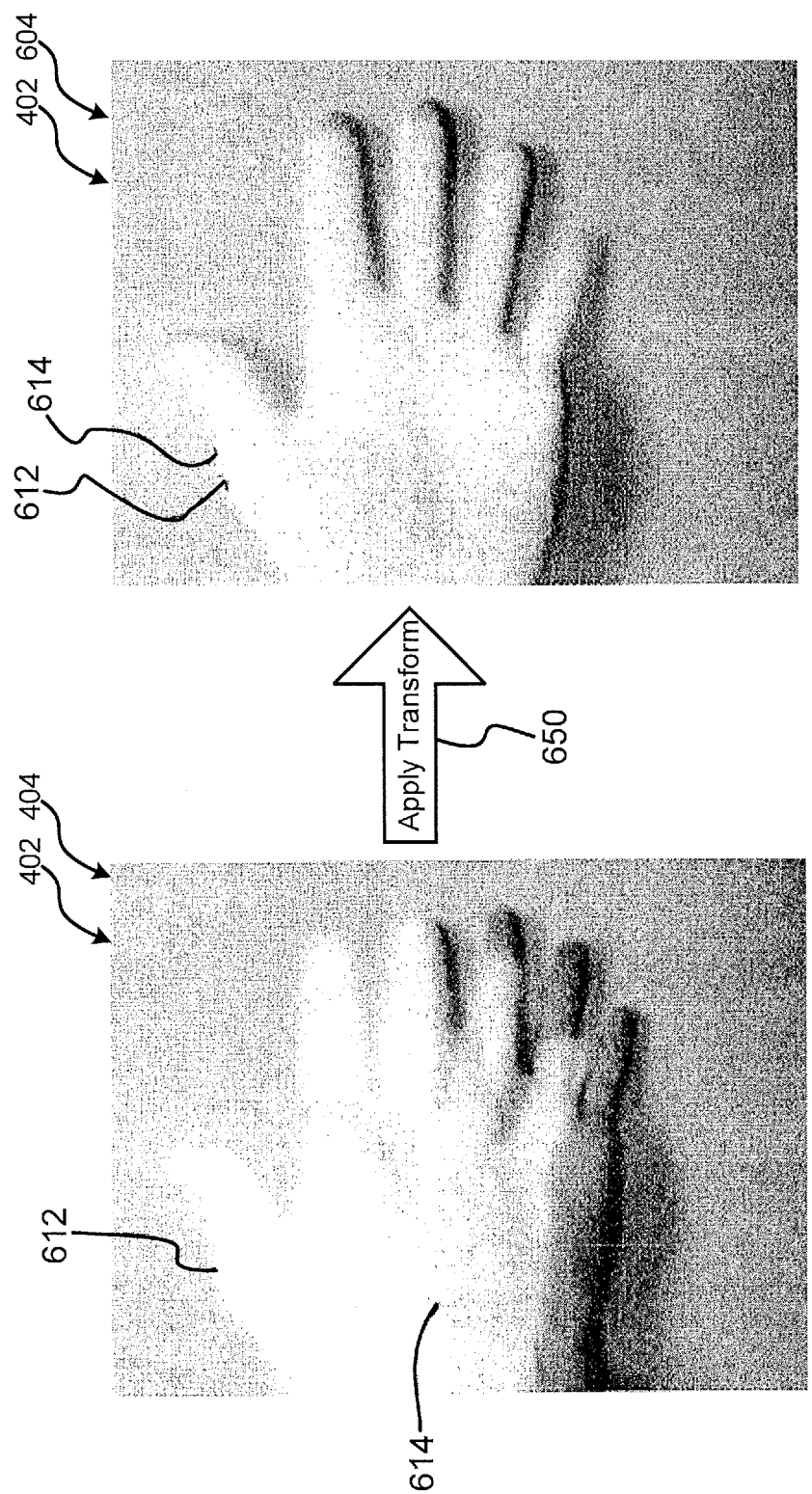
FIG. 6 illustrates example images that show how a VL image is at least approximately co-registered with a thermal image by a geometric transform in accordance with an embodiment of the disclosure.

At block 324, the determined geometric transform is applied to the captured VL image. The resulting transformed VL image is then at least approximately co-registered (e.g., aligned) with the captured thermal image. FIG. 6 illustrates an example where the transformed VL image 604 is at least approximately co-registered with the captured thermal image 402 after applying 650 the determined geometric transform, in accordance with an embodiment of the disclosure. In the example images of FIG. 6, the captured VL image 404 is shown overlaid onto the captured thermal image 402, which reveals that the captured VL image 404 not aligned/co-registered with the captured thermal image 402 (e.g., as can be understood from the misaligned contours 612 and 614 of a hand captured in the corresponding thermal image 402 and VL image 404) due to, for example, different FOVs, different pointing directions, and/or a parallax of the respective imaging module capturing the images, whereas the transformed VL image 604 shown overlaid onto the captured thermal image 402 reveals that the transformed VL image 604 is at least approximately co-registered with the captured thermal image 402 (e.g., as can be understood from the aligned contours 612 and 614 of the hand respectively in the captured thermal image 402 and the transformed VL image 604).

In some embodiments, method 300 may further include generating, at block 326, a combined thermal and VL image using the at least approximately co-registered thermal and VL images (e.g., using the captured thermal image 402 and the transformed VL image 604). In such embodiments, the combined thermal and VL image may be generated by superimposing, fusing, blending, and/or otherwise combining the captured thermal image and the transformed VL image using various image combining techniques, including any of the various techniques disclosed in the following patent applications: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of which applications are incorporated herein by reference in their entirety. Thus, for example, true color processing may be performed and/or high contrast processing may be performed to combine the captured thermal image and the transformed VL image.

Regarding true color processing, the captured thermal image may be blended with the transformed VL images by, for example, blending a radiometric component of the captured thermal image with a corresponding component of the transformed VL image according to a blending parameter, which may be adjustable by a user and/or machine in some embodiments. For example, luminance or chrominance components of the captured thermal image and the transformed VL image may be combined according to the blending parameter. In one embodiment, such blending techniques may be referred to as true color infrared imagery.

For example, in daytime imaging, a blended image may comprise a color image of the transformed VL image, which includes a luminance component and a chrominance component, with its luminance value replaced and/or blended with the luminance value from the captured thermal image. The use of the luminance data from the captured thermal image causes the intensity of the color image of the transformed VL image to brighten or dim based on the temperature of the object.

Regarding high contrast processing, also referred to as multi spectral dynamic imaging or MSX, high spatial frequency content may be obtained from the transformed VL image (e.g., by performing high pass filtering, difference imaging, and/or other techniques). A combined image may include a radiometric component of the captured thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from the transformed VL image may be blended with the captured thermal image by superimposing the high spatial frequency content onto the thermal image, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the captured thermal image, and the high spatial frequency content may be derived from the luminance and/or chrominance components of the transformed VL image. In such an embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the captured thermal image may be retained. In similar embodiments, blended image data may include the high spatial frequency content added to a luminance component of the captured thermal image, and the resulting blended data encoded into a luminance component of resulting combined images.

Advantageously, therefore, various embodiments of method 300 can dynamically co-register (e.g., align) images captured by two or more imaging modules even when the mechanical alignment (e.g., relative physical displacement) of the two or more imaging modules is not known, not stable, and/or not controlled at the time of production (e.g., such as when a user adds a second imaging module via a device attachment). Furthermore, various embodiments of method 300 can co-register images captured by imaging modules of different modality (e.g., sensitive to different spectra) to provide dynamic, multimodal (e.g., multispectral) image registration, which may especially be beneficial to systems and methods that generate combined (e.g., high-contrast fused, blended, superimposed, or otherwise combined) images from images of different modality such as a thermal image and a VL image.

In this regard, in some embodiments, operations of method 300 may continuously be repeated, for example when streams of images (e.g., video frames or videos) are each captured by thermal imaging module 106 and VL imaging module 108. In one example according to some embodiments, operations of method 300 may be performed every Nth video frame to update the geometric transform to be applied (e.g., the affine transform combination with the parameter combination that produces the lowest MSE).

In one embodiment, the subsequently determined geometric transforms (e.g., the determined affine transform parameter combinations) replace the previous ones, whereas in another embodiment the initial and the subsequently determined geometric transforms are used to calculate a weighted mean of the geometric transforms (e.g., the weighted mean of the determined affine transform parameters) to update the geometric transform to apply. In one example, the weight for calculating the weighted mean may be based on the MSEs of the neighboring reference point pair distances (e.g., inversely proportional to the MSEs) or based on other appropriate quality metrics associated with the initial and the subsequently determined affine transform parameter combinations.

The geometric transform to apply may be only partially updated according to some embodiments. For example, only the parameters for translation in the X axis and the Y axis from the affine transform parameter combination may be updated, whereas the initially determined parameters for a rotation angle and a scale factor are left intact. Since a change in the distance to an imaged object introduces residual parallax error while rotation and scaling transforms are independent of the distance to an imaged object, a more efficient update of the affine transform parameter combination may be performed by updating only the translation parameters after an initial determination of the affine transform parameter combination.

In one embodiment, the updates to the translation parameters may efficiently be performed by determining and using the average or median of the distances between dominant horizontal edges in the VL image and corresponding dominant horizontal edges in the thermal image to update the parameter for translation in the Y axis, and similarly the average or median distance between corresponding dominant vertical edges to update the parameter for translation in the X axis. In another embodiment, reference points (e.g., corner points) may be determined and used to update the translation parameters as discussed above for blocks 306 through 322 of method 300. In either embodiment, the update to the translation parameters may be dampened (e.g., added hysteresis or otherwise delayed), for example, by observing approximately the same parallax errors consecutively for a predetermined number of sample video frames before the translation parameters are updated.

The initially determined geometric transform (e.g., the initially determined affine transform parameter combination) and/or the updated geometric transform (e.g., the updated affine transform parameter combination) may be stored, for example, in a non-volatile memory of a host device such as mobile device 204 of multimodal imaging system 200, so that multimodal imaging system 200 produces co-registered multimodal images (also referred to herein as alignment-calibrated images) without having to perform an initial determination of the geometric transform to apply when powered up again. The geometric transform stored in the non-volatile memory may be reset or deleted, for example when a user detaches and reattaches device attachment 202 to mobile device 204 or wishes to reset the geometric transform for other reasons (e.g., when image registration based on the stored geometric transform fails).

As discussed above in connection with blocks 302 and 304 of method 300, the initial determination of the geometric transform to apply can be by imaging effective target objects such as a user's hand at an arm's length or a reference target to obtain registration calibration (or alignment calibration) after mobile device 204 is powered up with device attachment 202 attached, after device attachment 202 is first attached to mobile device 204, or in other situations when a user wishes to reset the stored geometric transform. Because the approximate distance to such target objects may be known and/or in a desired range of distance (e.g., an arm's length or a reference distance set by a tape/string measure provided with device attachment 202), the initial geometric transform obtained by such registration calibration (alignment calibration) using effective target objects may provide tolerable parallax error for a desired range of imaging distance.

Figure 7:
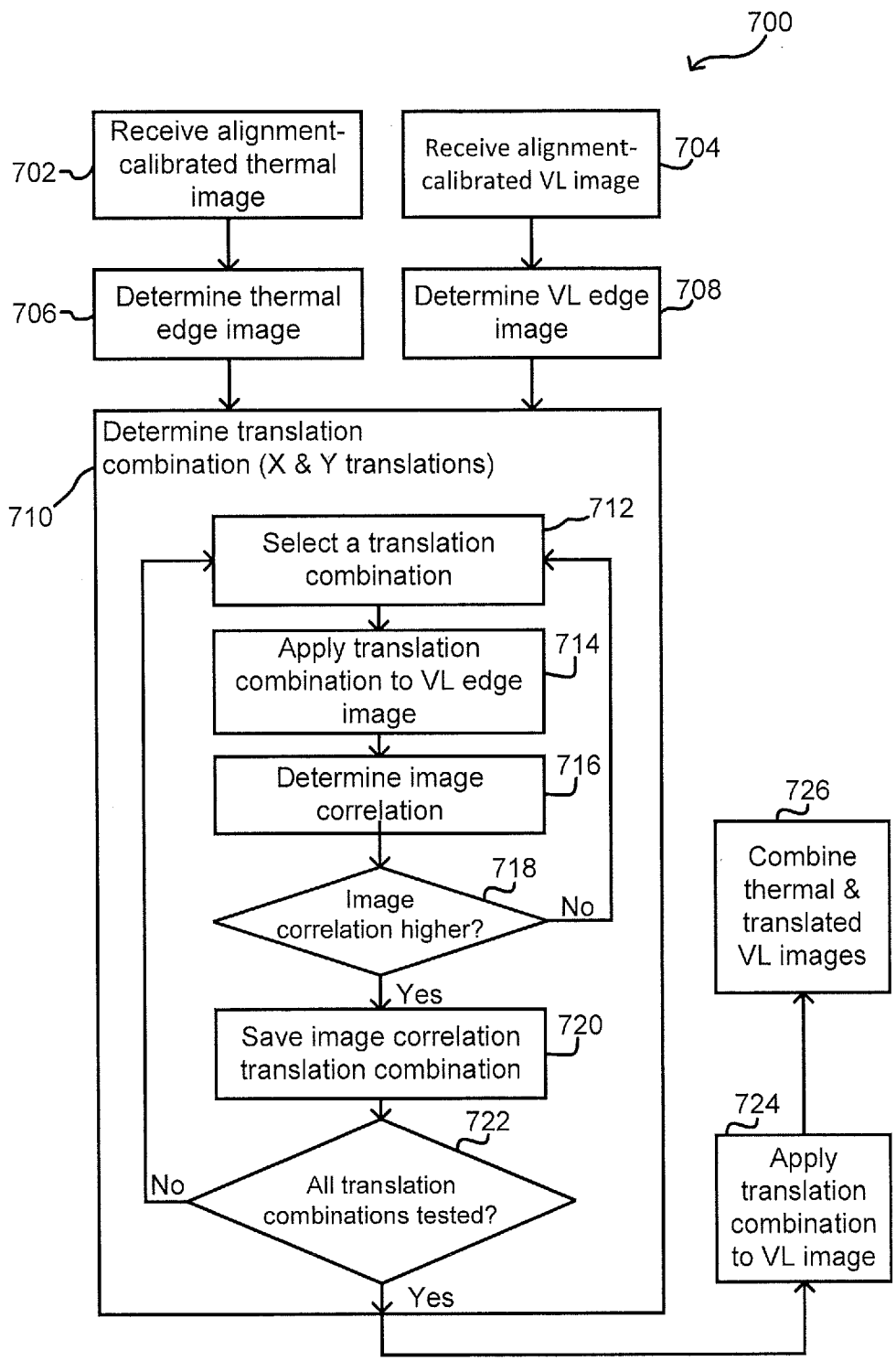
FIG. 7 illustrates a flowchart of a method to correct parallax errors in images captured by different imaging modules in accordance with an embodiment of the disclosure.

As also briefly discussed above, in some embodiments, residual parallax errors introduced after alignment calibration due to changes in the distance to an imaged object may be efficiently corrected by determining and updating only the translation parameters. FIG. 7 illustrates such a method 700 to determine and update translation parameters in accordance with an embodiment of the disclosure. Method 700 according to various embodiments may be performed by or for multimodal imaging system 100 or 200 using alignment-calibrated image pairs (also referred to herein as registration-calibrated image pairs) determined by various embodiments of method 300 as inputs, for example, using pairs of VL images transformed according to an initially determined affine transform combination and corresponding co-registered thermal images (e.g., the transformed VL image 604 and the captured (also cropped as needed) thermal image 402 in FIG. 6), pairs of thermal images transformed according to an initially determined affine transform combination and corresponding co-registered VL images, or pairs of transformed thermal images and corresponding transformed VL images co-registered through an initial calibration.

At blocks 702 and 704, such an alignment-calibrated image pairs are received, receiving an alignment-calibrated thermal image at block 702 and receiving an alignment-calibrated VL image at block 704. In some embodiments, a luminance channel or component (e.g., greyscale channel or component, Black-and-White channel or component, intensity channel or component, brightness channel or component, or other channel or component of an image that represents an intensity or brightness, rather than hue or coloredness, of the image) may be extracted from the alignment-calibrated thermal image and/or the alignment-calibrated VL image at blocks 702 and/or 704, and used in various operations of method 700, such as when determining edge images or determining a translation pair, for a more efficient execution of such operations.

In some embodiments, blocks 702 and/or 704 may include resizing the captured thermal image and/or the captured VL image. For example, the alignment-calibrated VL image may be downscaled or downsampled (e.g., by bilinear scaling or other appropriate techniques) to match or at least approximately match (e.g., accounting for a mismatch in aspect ratio or other tolerances) the resolution (e.g., image dimension) of the alignment-calibrated thermal image. As another example, the alignment-calibrated thermal image may be upsampled or upscaled (e.g., by bilinear interpolation or other appropriate techniques) to match or at least approximately match the resolution of the alignment-calibrated VL image. As another example, the alignment-calibrated thermal image and/or the alignment-calibrated VL image may be resized to a predetermined resolution (e.g., to a resolution or image dimension of 160×120 pixels in one specific implementation). Matching the resolution of the alignment-calibrated images according to these embodiments may facilitate processing of the alignment-calibrated images, such as when determining the correlation of edge images or combining images. In addition, by downscaling or downsampling the alignment-calibrated thermal image, the alignment-calibrated VL image, or both, the size of the data (e.g., edge images comprising edges or contours extracted from the alignment-calibrated images) to be processed may advantageously be reduced to allow various operations of method 700 to be performed more efficiently, for example.

In some embodiments, high frequency noise, if present, may be reduced or suppressed from the alignment-calibrated thermal image and/or the alignment-calibrated VL image. For example, high frequency noise in the alignment-calibrated thermal image and/or the alignment-calibrated VL image may be reduced or removed by low-pass filtering the images, applying a Gaussian blur to the images, or by other suitable techniques that remove or suppress high frequency content while retaining lower frequency content. The alignment-calibrated thermal image and/or the alignment-calibrated VL image with high frequency noise reduced or suppressed according to these embodiments may advantageously permit a more accurate processing of the alignment-calibrated images, such as when determining edge images and determining the correlation of edge images.

Block 702 may also include sharpening the alignment-calibrated thermal image, according to some embodiments. For example, the alignment-calibrated thermal image, especially edges or other structural details in the alignment-calibrated thermal images, may be sharpened by applying an unsharp mask or other appropriate image or edge sharpening techniques. Since thermal images typically have lower resolution, definition, and/or signal-to-noise ratio (SNR), sharpening the alignment-calibrated thermal images according to these embodiments may advantageously permit a more accurate processing of the alignment-calibrated thermal image, such as when determining a thermal edge image.

At blocks 706 and 708, a thermal edge image and a VL edge image are determined from the alignment-calibrated thermal image and the alignment-calibrated VL image, respectively. As discussed above, the alignment-calibrated thermal image and/or the alignment-calibrated VL image may be resized, noise-reduced, sharpened, and/or intensity-channel versions of the respective images, depending on embodiments. Determining an edge thermal image may involve detecting edges or contours of an object captured (e.g., depicted) in the alignment-calibrated thermal image by performing edge detection on the thermal image. Similarly, determining an edge VL image may involve detecting edges or contours of the object captured in the alignment-calibrate VL image by performing edge detection on the thermal image. For example, edge detection may be performed on the alignment-calibrate thermal image and the alignment-calibrate VL image using a Canny edge detector, a Deriche edge detector, differential edge detector, a Sobel filter, a high-pass filter, or other techniques to detect discontinuities or gradient changes in images.

Figure 8A:
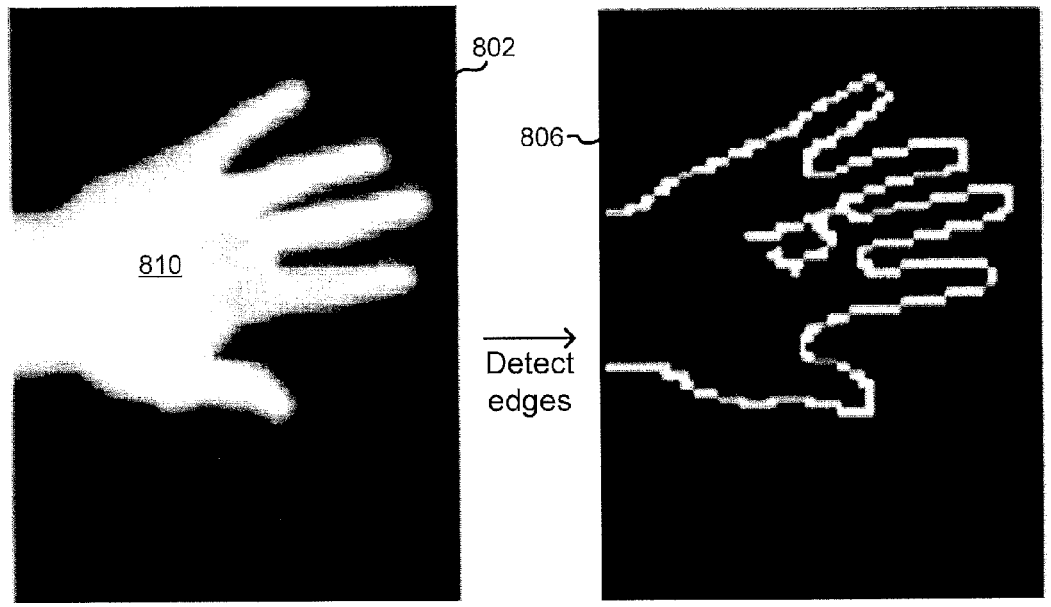
FIG. 8A illustrates an example thermal image and a corresponding thermal edge image in accordance with an embodiment of the disclosure.
Figure 8B:
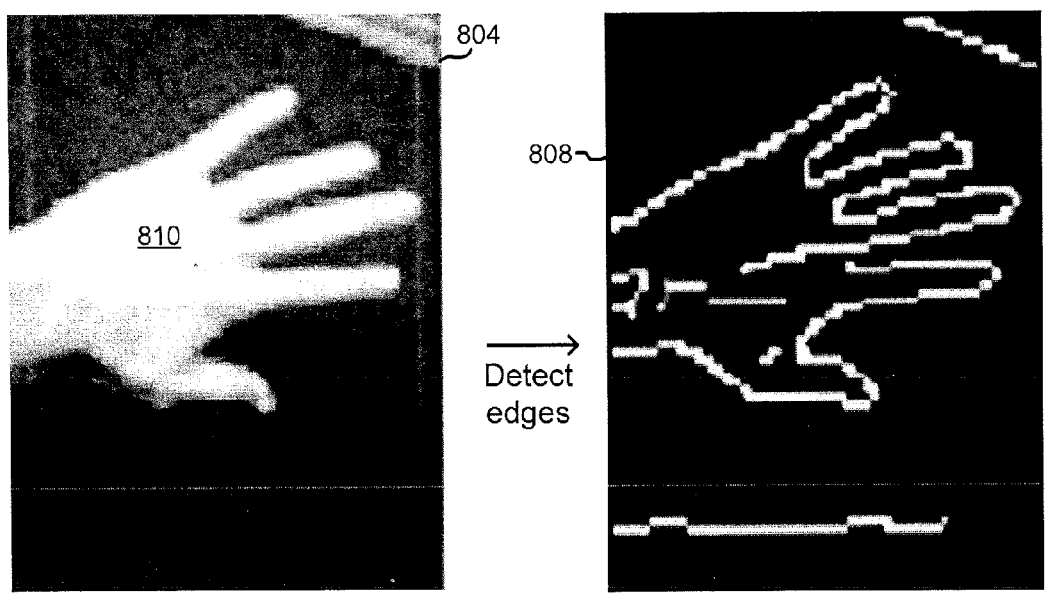
FIG. 8B illustrates an example VL image and a corresponding VL edge image in accordance with an embodiment of the disclosure.

Referring also to FIGS. 8A and 8B, examples are illustrated of a thermal edge image 806 (also referred to herein as a thermal edge map) determined at block 706 from a thermal image 802 (e.g., an alignment-calibrated thermal image) of an object 810 (e.g., a hand) and a VL edge image 808 (also referred to herein as a VL edge map) determined at block 708 from a VL image 804 (e.g., an alignment-calibrated VL image) of object 810, in accordance with an embodiment of the disclosure. As shown in these examples, thermal edge image 806 comprises contours and image details (e.g., where temperature gradient changes rapidly) of object 810, and VL edge image 808 comprises contours and image details of object 810 and also some edges not visible in thermal edge image 806. In this regard, unlike reference points determined and used for method 300, thermal edge image 806 and VL edge image 808 often do not show strict or high correspondence. Thus, as discussed further below, a correlation measure between thermal edge image 806 and VL edge image 808 may be determined and used for comparison.

Edge images 806 and 808 are illustrated in FIGS. 8A and 8B as 2D images, maps, matrices with "on" pixels or elements (e.g., having some constant value other than zero) in locations where edges or contours are detected in corresponding alignment-calibrated images 802 and 804. However, edge images 806 and 808 are not limited such a format, but instead may include any other suitable data structure or format configured to store or describe the locations of edges or contours in corresponding alignment-calibrated images 802 and 804. For embodiments in which edge images 806 and 808 include a 2D image, map, or matrix format, edges images 806 and 808 may be resized to a smaller predetermined resolution (e.g., to a resolution or image dimension of 80×60 pixels in one specific implementation), such as by downsampling or downscaling, for a more efficient execution of various operations following blocks 806 and 808, as desired for particular implementations.

At block 710, a translation combination to apply to the alignment-calibrated thermal image or the alignment-calibrated VL image is determined based on the thermal edge image and the VL edge image (e.g., thermal edge image 806 and VL edge image 808). As discussed above, a translation combination may comprise a translation in the X-axis, column, or horizontal direction (X-translation for short) and a translation in the Y-axis, row, or vertical direction (Y-translation for short), and may be determined such that the thermal edge image and the VL edge image, and hence the corresponding alignment-calibrated thermal image and alignment-calibrated VL edge image, may be at least approximately registered to each other (e.g., deemed matched according to a predetermined metric, criterion, or error threshold) to correct for any residual parallax error introduced due to changes in the distance to an object being depicted.

In this regard, the translation combination may be determined such that the VL edge image (or the thermal edge) image translated according to the translation combination are highly correlated with the thermal edge image (or the VL edge image). In the embodiments illustrated with reference to FIG. 7, the determined translation combination (e.g., X-translation and Y-translation) is to be applied to the VL image to at least approximately map reference points 408 to corresponding reference points 406 in the thermal image. However, in other embodiments, the translation combination may be determined for applying instead to the thermal image, or two translation combinations may be determined respectively for applying to the thermal image and the VL image.

Similar to method 300, determining the transform combination according to some embodiments may comprise iteratively finding the transform combination. Specifically for method 700, operations at block 710 may comprise iteratively sweeping over a predetermined range of X-translations and Y-translations (e.g., by a nested loop) to find the X-translation and Y-translation combination that produces the highest correlation between the VL edge image and the thermal edge image when applied to the VL edge image or the thermal edge image.

In the example embodiment illustrated with reference to FIG. 7, block 710 comprises selecting, at block 712, a candidate X-translation and Y-translation combination from a predetermined range. For example, the predetermined range may comprise up to half of the image dimension in each direction for both the X-axis and the Y-axis in one specific implementation. One X-translation and one Y-translation may be selected from the predetermined range and tested for each iteration, as further discussed below. Block 710 further comprises translating, at block 714, the VL edge image according to the selected translation combination. In this regard, blocks 712 and 714 are similar to blocks 312 and 314 of FIG. 3, except that other affine transforms, such as scaling and rotation, need not be selected or applied.

Block 710 further comprises determining, at block 716, a correlation (e.g., a correlation metric or measure) between the translated VL edge image and the thermal edge image. The correlation determined at block 716 may represent or indicate how well the locations of the edges and/or contours in the translated VL edge image and the thermal edge image correspond or correlate. Thus, in some embodiments, the correlation may be determined by determining how many of the pixels or elements indicating detected edges and/or contours in the translated VL edge image coincide with (e.g., at or near same locations as) the pixels or elements indicating detected edges and/or contours in the thermal edge image. For example, the correlation may be determined by taking a two-dimensional (2D) dot product of the translated VL edge image and the thermal edge image, such as by multiplying each pixel or element of one edge image with a pixel or element at a corresponding location in the other edge images and summing those products. Since edges and/or contours may be indicated by "on" pixels or elements in edge images as discussed above, those pixels or elements that are at the same locations in the two images will contribute to the 2D dot product.

Figure 9:
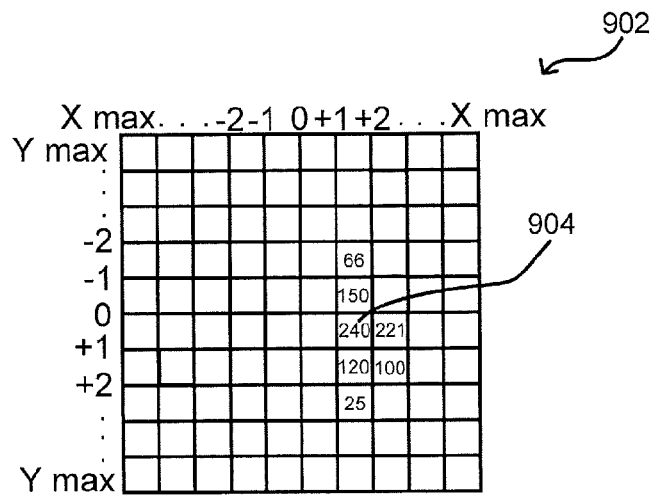
FIG. 9 illustrates a correlation matrix configured to store correlations and associated translation combinations in accordance with an embodiment of the disclosure.

In some embodiments, block 716 may include recording (e.g., storing) the determined correlation with the associated translation combination that is applied (e.g., the selected translation combination for the iteration). As further discussed below, by recording the correlation and the associated translation combination in these embodiments, information regarding the history of parallax correction by method 700 may be accumulated and used for a more efficient parallax correction through estimation. For example, a data structure configured to record the determined correlation with the associated translation combination is illustrated in FIG. 9, in accordance with an embodiment of the disclosure. In the example of FIG. 9, a 2D matrix 902 (e.g., also referred to herein as a correlation matrix 902) is shown where the row index corresponds to the Y-translation (row translation) of the selected translation combination and the column index corresponds to the X-translation (column translation) of the selected translation combination, such that the determined correlation can be recorded at the corresponding indexed location. For example, if the determined correlation (e.g., as determined by taking the 2D dot product) for the selected translation of +2 translation in the X-axis and +1 translation in the Y-axis is a correlation metric of value of 240, that value can be recorded at location 904 (row=+1 and column=+2) of correlation matrix 902. However, it should be appreciated that correlation matrix 902 is illustrated as an example, and that any other suitable data structure configured to store or record the determined correlation with the associated translation combination may be used as desired.

The correlation determined at block 716 is then compared, at block 718, with the highest correlation from any previous iteration of block 710. Block 718 is similar to block 318 of FIG. 3, except that it operates to find the highest correlation among tested rather than the lowest MSE. More specifically, if at block 718 it is determined that the correlation determined for the current iteration is higher than the previously stored highest correlation, then the currently determined correlation and the associated translation combination are saved as the highest correlation and the corresponding best translation combination so far, at block 720. If at block 718 it is determined that the currently determined correlation is not higher than the previously saved highest correlation, then method 700 flows back to block 712 to repeat blocks 712 through 818 with a newly selected translation for another iteration.

At block 722, after saving the currently determined correlation and the associated translation combination as the new highest MSE and the new best translation combination, it is determined whether all translation combinations over the predetermined range have been tested or not (e.g., whether all iterations of a nested loop have been performed or not). If not, method 700 flows back to block 712 to repeat blocks 712 through 720 with a newly selected translation combination. If all translation combinations over the predetermined range have been tested, then the iterations of blocks 712 through 722 comprised in block 710 are completed.

Thus, after the iterations of blocks 712 through 722 comprised in block 710 are performed, the translation combination among translation combinations over a predetermined range that best correlates the translated VL edge image with the thermal edge image, and hence most effectively reduces parallax errors between the alignment-calibrated thermal image and the alignment-calibrated VL image, may be determined as the translation combination to apply to the alignment-calibrated VL image.

This translation combination can be applied to the alignment-calibrated VL image (i.e., the alignment-calibrated VL image can be translated according to this translation combination) at block 724. Additionally, in embodiments in which the determined correlations and the corresponding translation combinations are recorded (e.g., in correlation matrix 902), an accumulated history of parallax correction by method 700 is available, and block 724 may include estimating a translation combination to apply based on the history of correlation and translation information.

Figure 10:
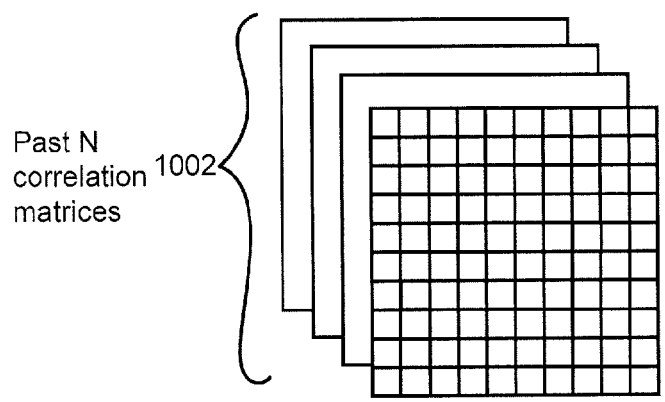
FIG. 10 illustrates a plurality of correlation matrices used as history information to determine an estimate of a translation combination in accordance with an embodiment of the disclosure.
Figure 10:
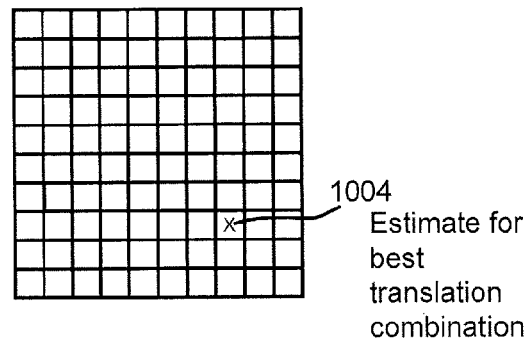

For example, as illustrated in FIG. 10 in accordance with an embodiment of the disclosure, the past N (N may be a predetermined or variable number) correlation matrices 1002 or information otherwise representing the association between correlations and translations for the past N runs of method 700 may be analyzed (e.g., statistically analyzed) to determine an estimate 1004 of a translation combination to apply to correct a parallax error based on the history of parallax corrections by method 700. The analysis of correlation matrices 1002 or other forms of data or information regarding the history of the association between correlations and translations may include various statistical methods, for example, those based on the aggregate (e.g., sum) of the correlations (e.g., correlation metrics) over the past N correlation matrices 1002 for each translation combination to select the translation combination with the highest aggregate as the estimate 1004, on the frequency and the cardinality of translation combinations (e.g., frequency of best M translation combination), based on an average and/or variance of each translation combination, or based on other suitable statistical metrics. These statistical methods may also involve weighting (e.g., weighted sum, weighted average), for example, to age or attenuate sample points, or otherwise adapting to various parameters.

For embodiments using such history information to determine an estimate of the translation combination to apply, the estimate, instead of the translation combination determined at block 710, may be applied to the alignment-calibrated VL image, thereby providing parallax corrected images quickly and more efficiently without having to wait for various operations of blocks 706 through 722 to complete. For example, such history-based estimation may be performed periodically, or when multimodal imaging system 100 or 200 is powered up, or in other situations where a quick response time to produce parallax corrected images are desired.

At block 726, the translated VL image (e.g., the parallax-corrected VL image), which may be obtained by translating the alignment-corrected VL image according to either the translation combination determined at block 710 or the estimated translation combination, may be combined with the alignment-corrected thermal image. The combining may be performed in a similar manner as block 326 discussed above with reference to FIG. 3.

Method 700 described above for various embodiments may thus efficiently provide parallax correction for multimodal image pairs that have been initially calibrated for registration (e.g., alignment) by method 300. For example, in some embodiments, method 300 may be performed to provide alignment calibration (e.g., provide an affine transform parameter combination that produces at least approximately co-registered images) apply when mobile device 204 is powered up with device attachment 202 attached, when device attachment 202 is first attached to mobile device 204, or in other situations when calibration is desired, while method 700 may be more frequently performed on the alignment-calibrated images to provide further parallax correction of images and videos as needed (e.g., on a real-time or near-real time basis or otherwise frequently such as for every N video/image frames). However, it is also contemplated for some embodiments that method 700 may be performed as a stand-alone process or as an alternative to method 300 to provide efficient and responsive parallax correction of multimodal images.

Therefore, various embodiments of the disclosure may also beneficially provide dynamic determination and update of the geometric transform to obtain co-registered multimodal video streams from two or more imaging modules, even when the mechanical alignment (e.g., relative physical displacement) of the two or more imaging modules is not known, not stable, and/or not controlled at the time of production (e.g., such as when a user adds a second imaging module via a device attachment), and even when the distance to the imaged objects or other conditions change as the video streams are captured.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An imaging system, comprising:
a thermal imaging device comprising a thermal imaging module configured to capture a thermal image of an object;
a visible light(VL) imaging device comprising a VL imaging module configured to capture a VL image of the object; and
one or more processors communicatively coupled to the thermal imaging module and the VL imaging module, the one or more processors configured to:
determine a thermal edge image based on the thermal image, the thermal edge image representing edges and/or contours captured in the thermal image,
determine a VL edge image based on the VL image, the VL edge image representing edges and/or contours captured in the VL image,
determine, based on the VL edge image and the thermal edge image, a horizontal translation and a vertical translation from a range of horizontal and vertical translations, such that a correlation between the VL edge image and the thermal edge image is highest when the VL edge image or the thermal edge is translated according to the horizontal translation and the vertical translation, and
apply the horizontal translation and the vertical translation to the thermal image or the VL image to correct a parallax error between the thermal image and the VL image.

2. The imaging system of claim 1, wherein the one or more processors are configured to:
determine a plurality of thermal image reference points from the thermal image;
determine a plurality of VL image reference points from the VL image,
determine a geometric transform based on the plurality of thermal image reference points and the plurality of VL image reference points, such that the geometric transform at least approximately maps the plurality of thermal image reference points to the plurality of VL image reference points or at least approximately maps the plurality of VL image reference points to the plurality of thermal image reference points; and
apply the geometric transform to the thermal image or the VL image to align the thermal image and the VL image.

3. The imaging system of claim 2, wherein:
the VL imaging device includes a mobile device;
the thermal imaging device includes a device attachment configured to releasably attach to the mobile device; and
the one or more processors includes a processor of the mobile device and/or a processor of the device attachment.

4. The imaging system of claim 2, wherein the device attachment is releasably attachable to the mobile device by engaging a device connector receptacle of the mobile device with a corresponding device connector plug of the device attachment.

5. The imaging system of claim 2, wherein:
the geometric transform comprises a combination of one or more affine transforms; and
the one or more processors are configured to determine one or more affine transform parameters for the combination of one or more affine transforms to determine the geometric transform.

6. The imaging system of claim 5, wherein the combination of one or more affine transforms include a translation transform in an X axis, a translation transform in a Y axis, a rotation transform, and a scaling transform.

7. The imaging system of claim 5, wherein the one or more processors are configured to determine the one or more affine transform parameters by an iterative process.

8. The imaging system of claim 5, wherein:
the one or more processors are configured to select the one or more affine transform parameters from a range of affine transform parameters to determine the one or more affine transform parameters; and
the combination of one or more affine transforms with the selected one or more affine transform parameters maps the plurality of thermal image reference points to the plurality of VL image reference points or maps the plurality of VL image reference points to the plurality of thermal image reference points, such that a mean square error of the distances between the plurality of VL image reference points and the corresponding plurality of thermal image reference points is minimized over the range of affine transform parameters.

9. The imaging system of claim 2, wherein the one or more processors are configured to:
detect peak corner points from the object captured in the thermal image as the plurality of thermal image reference points; and
detect peak corner points from the object captured in the VL image as the plurality of VL image reference points.

10. The imaging system of claim 1, wherein the one or more processors are configured to determine a correlation between the VL edge image and the thermal edge image for each of the range of horizontal and vertical translations applied to the VL edge image or the thermal edge image, wherein the correlation is determined by a two-dimensional (2D) dot product of the VL edge image and the thermal edge image.

11. The imaging system of claim 1, wherein the one or more processors are configured to determine the thermal edge image and the VL edge image at least by detecting the edges and/or contours from the thermal image and the VL image.

12. A method comprising:
capturing a thermal image of an object;
capturing a visible light (VL) image of the object;

determining a thermal edge image based on the thermal image, the thermal edge image representing edges and/or contours captured in the thermal image;

determining a VL edge image based on the VL image, the VL edge image representing edges and/or contours captured in the VL image;

determining, based on the VL edge image and the thermal edge image, a horizontal translation and a vertical translation from a range of horizontal and vertical translations, such that a correlation between the VL edge image and the thermal edge image is highest when the VL edge image or the thermal edge is translated according to the horizontal translation and the vertical translation; and applying the horizontal translation and the vertical translation to the thermal image or the VL image to correct a parallax error between the thermal image and the VL image.

13. The method of claim 12, comprising:

determining a plurality of thermal image reference points from the thermal image;

determining a plurality of VL image reference points from the VL image;

determining a geometric transform based on the plurality of thermal image reference points and the plurality of VL image reference points, such that the geometric transform at least approximately maps the plurality of thermal image reference points to the plurality of VL image reference points or at least approximately maps the plurality of VL image reference points to the plurality of thermal image reference points; and applying the geometric transform to the thermal image or the VL image to align the thermal image and the VL image.

14. The method of claim 13, wherein:

the geometric transform comprises a combination of one or more affine transforms; and the determining of the geometric transform comprises determining one or more affine transform parameters for the combination of one or more affine transforms.

15. The method of claim 14, wherein the combination of one or more affine transforms include a translation transform in an X axis, a translation transform in a Y axis, a rotation transform, and a scaling transform.

16. The method of claim 14, wherein the determining of the one or more affine transform parameters is by an iterative process.

17. The method of claim 14, wherein:

the determining of the one or more affine transform parameters comprises selecting the one or more affine transform parameters from a range of affine transform; and the combination of one or more affine transforms with the selected one or more affine transform parameters maps the plurality of thermal image reference points to the plurality of VL image reference points or maps the plurality of VL image reference points to the plurality of thermal image reference points, such that a mean square error of the distances between the plurality of VL image reference points and the corresponding plurality of thermal image reference points is minimized over the range of affine transform parameters.

18. The method of claim 13, further comprising:

detecting peak corner points from the object captured in the thermal image as the plurality of thermal image reference points; and detecting peak corner points from the object captured in the VL image as the plurality of VL image reference points.

19. The method of claim 12, further comprising determining a correlation between the VL edge image and the thermal edge image for each of the range of horizontal and vertical translations applied to the VL edge image or the thermal edge image, wherein the correlation is determined by a two-dimensional (2D) dot product of the VL edge image and the thermal edge image.

20. The method of claim 12, wherein:

the determining of the thermal edge image comprises detecting the edges and/or contours from the thermal image; and the determining of the VL edge image comprises detecting the edges and/or contours from the VL image.

* * * * *